July 14, 1931. H. E. ALTGELT 1,814,815
AGRICULTURAL IMPLEMENT
Filed Aug. 8, 1927
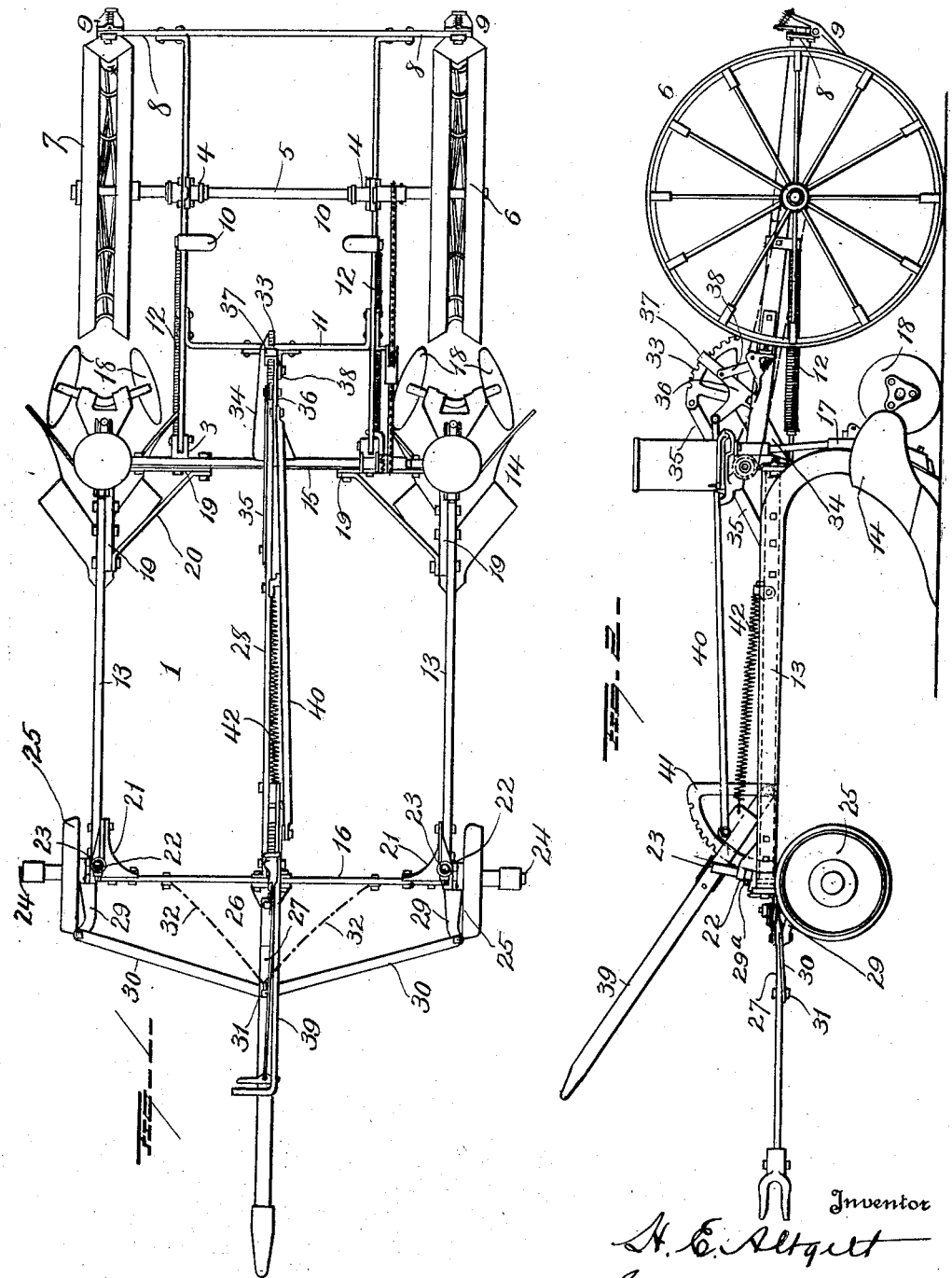
Inventor
H. E. Altgelt
By Seymour & Bright
Attorneys Patented July 14, 1931

1,814,815

UNITED STATES PATENT OFFICE

HERMAN E. ALTGELT, OF SOUTH BEND, INDIANA, ASSIGNOR, BY MESNE ASSIGNMENTS, TO OLIVER FARM EQUIPMENT COMPANY, A CORPORATION OF DELAWARE

AGRICULTURAL IMPLEMENT

Application filed August 8, 1927. Serial No. 211,569.

This invention relates to improvements in agricultural implements, and more particularly to two-row listers,—one object of the invention being to provide simple and efficient means for raising and lowering the soil-engaging members.

A further object is to so construct and arrange the lifting mechanism that the same shall be well adapted for use on a two-row lister constructed and adapted for attachment to a tractor, and so that the hand lever of such lifting mechanism shall be positioned within convenient reach of the operator on the tractor.

With these and other objects in view, the invention consists in certain novel features of construction and combinations of parts as hereinafter set forth and pointed out in the claims.

In the accompanying drawings;

Figure 1 is a plan view of a two-row lister, illustrating an embodiment of my invention, and Figure 2 is a view in side elevation.

My improved lister includes front and rear frames 1 and 2 hinged together end to end through the medium of brackets 3 secured to one of said frames and having pivotal connection with the other frame.

In the embodiment of the invention shown in the drawings, the rear frame 2 is made narrower than the front frame 1 and has secured to its parallel side members, bearings 4 for a rear axle 5 which projects at its ends appreciably beyond the sides of the frame 2. Carrying wheels 6, 7 are located at respective ends of the axle 5 and are disposed directly in rear of soil engaging devices (hereinafter described) carried by the front frame 1 at the rear corners thereof. The wheel 6 is secured rigidly to the axle for reasons which will hereinafter appear, but the wheel 7 may be loose on the axle. The rear cross bar of the rear frame may be extended at 8, 8 to provide supports for scrappers 9, 9 for the carrying wheels.

Foot rests 10, 10, may be secured to the side bars of the rear frame in the event that the implement is converted into a horse drawn lister, with a seat on the rear frame as disclosed in my copending application Serial No. 211,568, and, in advance of these foot rests, the said side bars are connected by a transverse brace bar 11. The foot rests 10, 10 serve also as anchoring means for the rear ends of lifting springs 12, the forward ends of the latter being attached to the brackets 3 secured to the rear cross bar of the front frame.

The front frame 1 comprises two plow beams 13 having rear standards to which lister bases 14 or other furrow opener devices are secured; a rear cross bar 15, and a front cross bar 16. The beams 13 also carry seed spouts 17 and seed coverers 18. The end portions of the rear cross bar 15 are secured to the rear portions of the beams 13 through the medium of angle braces 19 and diagonal braces 20. The front cross bar 16 is connected at its ends with the forward ends of the beams 13, through the medium of angle brackets 21 securely bolted to said beams and cross bar. The brackets 21 are constructed to provide bearing sleeves 22 for the accommodation of the standard portions of front axles 23, the cranked portions 24 of said axles being made to project laterally with respect to the sides of the frame 1 and receive the front wheels 25 so that each of the latter will run at one side of the vertical axis of its axle and not trail behind such axis as in the case of a caster wheel. Collars 29ª on the axles and in recesses in the bearing brackets serve to prevent vertical displacement of the axles.

A bracket 26 is bolted to the front cross bar 16 centrally between the ends thereof, and to this bracket, the rear end portion of a draft member 27 is swiveled, said member constituting a draw bar adapted for connection with a tractor.

In order that the front cross bar 16 with which the draft member is connected shall be protected from bending when subjected to excessive draft strain, a central longitudinal brace 28, connecting said front cross bar 16 with the rear cross bar 15 of the front frame, is employed.

Arms 29 are made rigid with the front axles 23 and project forwardly therefrom. The outer end portions of links 30 are pivotally connected with said arms 29 and the inner ends of said links are pivotally connected at 31 with the rear end portion of the draft member. It will be observed that with the construction above described, the front wheels are dirigibly supported so that they will be disposed laterally of and parallel with the vertical portions of their axles, and by connecting the pivoted draft member with the loosely mounted axles, the front wheels become steering or guiding wheels and the guiding or steering is accomplished by lateral movements of the pivoted draft member and is of particular advantage when turning or backing the implement.

When the implement is adapted to be drawn by a tractor, chains 32 are connected at their forward ends with the draft member 27 in proximity to the connection of the links 30 therewith and the rear ends of said chains are connected with the front cross bar 16 between the center and ends of the latter. The chains have some slack in them, so that the tractor draft member or hitch bar can swing sidewise in turning the lister at the ends of a field or elsewhere. The object of the chains is to limit the extent which the tractor hitch bar can swing when backing the lister,—viz: pushing the lister backwards by means of the tractor.

The front frame 1 of the implement carries a toothed sector 33, the latter being provided with a comparatively long frame 34 secured at its forward end to the rear cross bar 15 of the front frame in such manner that said frame 34 will project rearwardly and somewhat upwardly and dispose the sector over the rear frame 2. A brace 35 is connected at one end to the sector frame and at the other end to the central longitudinal brace 40 of the front frame.

A bell-crank lever 36 is pivoted to the sector frame and has a hook portion 37 which embraces the segmental edge of the sector to provide guide means for said lever. The lever 36 is connected by a link 38, with the cross bar or brace 11 of the rear frame 2. When the lister is adapted to be drawn by horses, a hand lever will be substituted for the bell-crank lever and provided with a detent to engage the toothed edge of the sector, as shown and described in my copending application, but when the lister is adapted to be drawn by a tractor, as in the present case, the bell-crank lever 36 is employed and a hand lever 39 is located near the forward end of the front frame of the lister, within convenient reach of an operator on the tractor, and connected by a rod or link 40 with an arm of the bell-crank lever 36. A toothed sector 41 is secured to the forward portion of the central brace of the front frame and the hand lever is provided with a suitable detent for cooperation with said toothed sector. An auxiliary lifting spring 42 may be connected at one end with the lever 39 and at the other end with the central brace 28 of the front frame.

With my improvement, when using the lister behind a tractor, the front end of the hand lever 39 is down while the machine is plowing or planting, where it does not interfere because planting is generally done in practically straight rows. When turning at the ends of rows, or in transporting the machine from and to the field, the front end of the lever will be up and out of the way of the tractor.

It will be observed that when the lever 39 is raised and moved rearwardly, motion will be imparted through the rod or link 40 to the bell-crank lever 36, causing the latter to turn rearwardly and impart pressure, through the medium of link 38 to the rear frame 2, thus causing the rear end of the front frame and the soil engaging members carried thereby, to be raised. It is evident that reverse movement of the hand lever will cause the soil engaging members to be lowered to working positions.

Having fully described my invention what I claim as new and desire to secure by Letters-Patent, is:—

1. In a tractor-drawn lister, the combination with the framework and soil-engaging means, of a lifting lever located at the forward end of the frame so as to be within reach of an operator on a tractor, a supplemental lever connected with said soil-engaging means, lifting connections between said levers whereby said lifting connections and levers are so relatively arranged that the hand grip end of said first named lever will be in raised position when the soil engaging means are raised, and in lowered position when the soil-engaging means are in working positions.

2. In a tractor drawn lister, the combination with frame-work and soil-engaging means carried thereby, of a lifting lever located at the forward portion of the framework approximately coincident with the longitudinal axis thereof, a supplemental lever located at the rearward portion of the framework and operatively connected to said first named lever and lifting connections between said last named lever and the soil-engaging means, said lifting connections being operable to lift the soil-engaging means when the lifting lever is moved upwardly and rearwardly and lowered when the lifting lever is moved downwardly and forwardly.

3. In a lister, the combination with front and rear frames hinged together, and soil-engaging means carried by the rear portion of the front frame, of lifting means including a lever carried by the front frame and disposed over the rear frame and a connection between said lever and the rear frame.

4. In a lister, the combination with front and rear frames hinged together, and soil-engaging means carried by the rear portion of the front frame, of lifting means comprising a frame member secured to the rear portion of the front frame and projecting over the rear frame, a lever pivoted to said frame member, and a link connected with said lever and with the rear frame member.

5. In a lister, the combination with front and rear frames hinged together, and soil-engaging means carried by the rear portion of the front frame, of lifting means including a frame member secured to the front frame and extending over the rear frame, a bell-crank mounted on said frame member, a link connecting said bell crank with the rear frame, a hand lever located at the forward portion of the front frame, and a link connecting said hand lever with said bell crank.

6. In a lister, the combination with front and rear frames hinged together, a central longitudinal bar in the front frame, and soil engaging means carried by the rear portion of the front frame, of a frame member secured to the front frame and extending over the rear frame, a bell-crank pivoted to said frame member, a link connecting said bell-crank with the rear frame, a hand lever supported by the central longitudinal bar of the front frame, and a link connecting said hand lever with said bell-crank.

7. A lister comprising a front frame consisting of a pair of beams, soil-engaging members carried by the beams, front and rear cross bars rigidly connecting the beams and a central longitudinal brace rigidly connecting the cross bars, steering wheels supporting the front end of the front frame, a rear frame consisting of side bars hinged at their front ends to the rear cross bar of the front frame, and front and rear cross bars rigidly connecting the side bars, wheels supporting the rear frame, a rearwardly and upwardly projecting frame carried by the rear cross bar and the central longitudinal brace of the front frame, a bell crank pivoted on said rearwardly and upwardly projecting frame, a link connection between said bell crank and the front cross bar of the rear frame, and means at the front end of the front frame to actuate said bell crank.

In testimony whereof, I have signed this specification.

HERMAN E. ALTGELT.